Dec. 5, 1961  G. SIMMONS  3,012,156
SYSTEM FOR CONTROLLING OPERATION OF A PLURALITY OF
FUNCTIONALLY RELATED ELEMENTS
Filed March 13, 1957  7 Sheets-Sheet 1

INVENTOR
GORDON SIMMONS

BY

ATTORNEYS

INVENTOR
GORDON SIMMONS

INVENTOR
GORDON SIMMONS
BY
ATTORNEYS

INVENTOR
GORDON SIMMONS
BY
ATTORNEYS

United States Patent Office 3,012,156
Patented Dec. 5, 1961

3,012,156
SYSTEM FOR CONTROLLING OPERATION OF A PLURALITY OF FUNCTIONALLY RELATED ELEMENTS
Gordon Simmons, 2572 Ridgemore Road NW., Atlanta 18, Ga.
Filed Mar. 13, 1957, Ser. No. 645,707
6 Claims. (Cl. 307—116)

This invention relates to systems for controlling industrial operations and more particularly to a robot industrial control system capable of learning and performing routine plant operational functions usually assigned to regular operating personnel.

Industrial control devices provided by the prior art are limited to a specific functional purpose and are only capable of following a particular, stereotyped sequential program. These devices constitute little more than elaborate stepping switches or time sequence program monitors or merely operational servo-mechanisms which reduce the number of switches or levers that must be manipulated by a human operator.

The present invention provides a system capable of receiving instructions regarding the required operating procedure for a complex industrial process plant, remembering the instructions, and carrying them out in correlation with information received from plant instruments which measure the process variables. The novel method and apparatus of the invention is capable of receiving, remembering, and affecting the performance of any operating program which can be expressed in definite, unambiguous numerical terminology. In view of the high cost of human labor and the difficulties of obtaining, training and retaining qualified operating personnel, industrial control systems of the type provided by the present invention have material economic advantages.

It is accordingly a primary object of the invention to provide a novel robot industrial control system having the foregoing characteristics and advantages.

Another object is to provide a novel robot industrial control system characterized in the above manner which is dependable, of relatively simple construction, easy to maintain, compact and relatively inexpensive to manufacture.

Another object is to provide a novel robot industrial control system of the above type which is flexible permitting adjustment in accordance with desired changes in plant operations and which is capable of expansion to accommodate an increase in size and capacity of the plant operating under its control.

The functions of the novel robot industrial control system provided by the present invention are analogous to the formed habit-conditional reflex responses of an individual engaged in manual operation of a complex industrial process. The conditional reflex response involves principally the association of a number of visual, audible, or other sensory symbols with a predetermined action pattern. Observation of such symbols in the proper sequence of space and time automatically energize a certain group of synapses, which in turn call into operation the necessary muscles (servo-mechanisms) to effect the action required by the predetermined pattern. In the routine operation of machinery a skilled operator must develop a set of conditional reflex habit patterns which enable the performance of the necessary manual operations rapidly and dexterously in response to external visual, audible or other sensory signals. Usually a combination of at least two stimuli are required to trigger a useful conditional reflex response.

It is accordingly a further object of the present invention to provide a novel robot control system capable of establishing any desired reaction pattern for an industrial operation which may be easily changed or modified to meet changing conditions of the industrial operation.

Briefly, the present invention provides novel apparatus for controlling a process performed by a plurality of functionally related elements, in which a set of definite operating instruction codes manifesting a predetermined operating program are stored and then selectively readout and converted into excitatory signals related to the functionally related elements. Sensory signals are produced indicative of instantaneous conditions of related elements, i.e. process variables, and the interconnected elements are controlled responsively to excitatory signals under supervision of sensory signals to affect operation of related elements in accordance with the predetermined operating program.

A multi-channel instruction memory or storage device, which may include any conventional information storage means, such as magnetic tape, magnetic drums, static cores, perforated paper tape or punched cards, may be employed to store a set of instruction codes. The memory device is capable of receiving, storing and reading out a set of definite operating instruction codes related to the desired operating program of an industrial plant. Connected to the output of the memory device is a variable impedance interpreting or translating network, which may include a plurality of multi-switch relays equal to the number of channels of the memory device, operable to perform the necessary symbolic association to convert instruction codes from the memory device into excitatory operating signals. The organization of the memory device and the interpreting network can be modified and varied so as to utilize any rational symbolic system of instruction codes. The excitatory operating signals from the interpreting network are fed to a plurality of logical elements having two or more stable states connected to elements of an industrial plant to be controlled and to instruments of the industrial plant. The logical elements or "decision units" function responsively to excitatory operating signals to control operation of the plant elements in accordance with the instruction codes read out from the memory device under automatic supervision by conditions existing in the industrial plant as indicated by the plant instruments.

The interpreting network may be connected to a plurality of decision units equal to the total number of possible combinations that can be obtained by association of the basic code symbols from the memory device. For example, if the memory device and interpreting network are designed to handle eight variables, each variable having a radix of 2, the total number of decision units in the system would be $2^8$ or 256. If 16 two-state decision units are employed, for example, there will be over 65,000 ($2^{16}$) possible momentary operating combinations. This would give at least $(65,000)^{65,000}$ theoretically possible time sequential operating programs involving 16 plant functions which, for all practical purposes is infinite.

Each decision unit has two or more stable states and is constructed as to be maintained in one of its stable states until changed to another stable state responsively to a unique signal from the interpreting network or from an extraneous source, such as an instrument of the industrial plant being controlled. The decision units taken as a whole constitute a modular decision unit panel, and each of the decision units may be associated with a particular step or function of the process performed by the industrial plant being controlled. The decision units may have a number of plug-in connectors, and some of the plug-in connectors may have associated switches designed to be operated responsively to formation of a plug-in connection. The plug-in connectors may be utilized to connect a portion of a decision unit to another portion of the same decision unit, to interconnect decision units, and to connect decision units to elements and instruments of the industrial plant being controlled. The plug-in connectors of a group of decision units may be connected together in a wide variety of patterns, with each pattern representing a unique conditional reflex response to instructions from the memory device.

Training of a novel robot industrial control system provided by the present invention for any particular operational performance, consists of the preparation of coded data which is supplied to the memory device and in the predetermined arrangement of the plug-in connectors of a group of decision units. When this has been accomplished, the robot industrial control system will control the plant operations automatically, carrying out the coded instructions from the memory device and correlating such instructions with process variables, that is, supplemental information received from instruments of the industrial plant.

Other objects and features of the present invention will become apparent from the following detailed description considered in connection with the accompanying drawings. It is to be expressly understood however, that the drawings are designed for purposes of illustration only and not as a definition of the limits of the invention, reference for the latter purpose being had to the appended claims.

In the drawings, in which similar reference characters denote similar elements throughout the several views.

Figure 1:
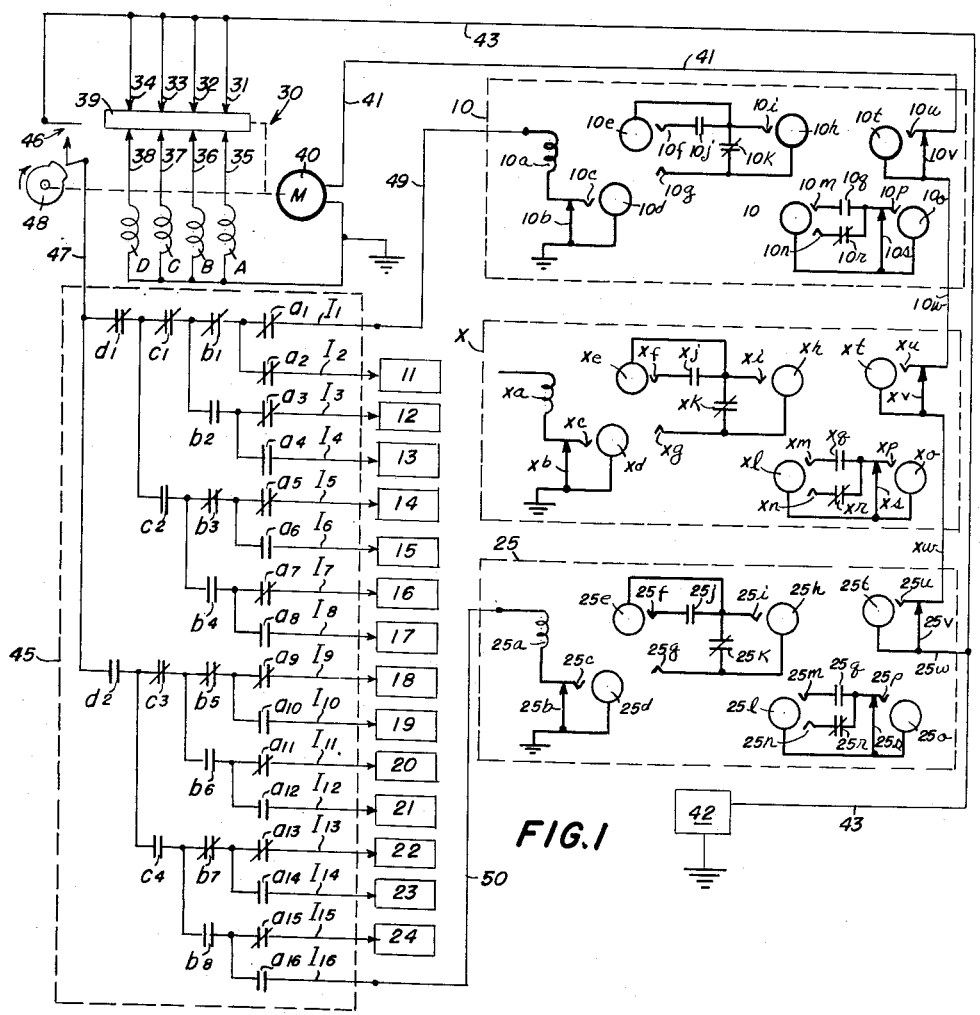
FIGURE 1 is a schematic diagram of a novel robot industrial control system constructed in accordance with the principles of the present invention.
Figure 2:
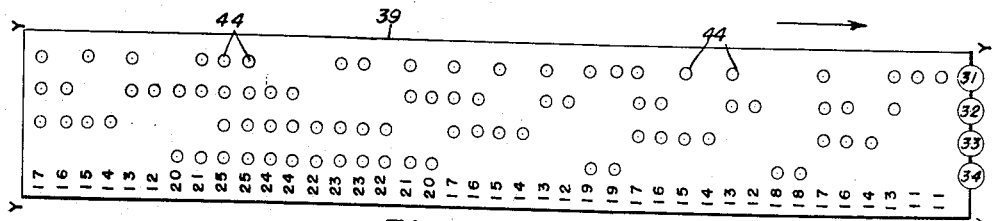
FIGURE 2 is a development of information storage means carrying instruction codes for operating an industrial plant.

With reference more particularly to FIGURE 1 of the drawings, a robot industrial control system constructed in accordance with the principles of the present invention is shown therein including a non-volatile memory device 30. The memory device includes a plurality of sensing fingers 31, 32, 33 and 34, each having an associated contact 35, 36, 37 and 38, respectively, between which a perforated paper tape 39 is adapted to be moved by motive means 40. The motive means may include an electric motor and a clutch device controlled by a signal fed thereto by a conductor 41. The sensing fingers are connected to a voltage source 42 through a conductor 43, and the contacts 31, 32, 33 and 34 are connected to ground potential through actuating coils A, B, C and D, respectively. The tape may be perforated to carry a predetermined set of definite instruction codes as illustrated in FIGURE 2 which shows a development of a loop type of tape, cut along the line Y—Y, including perforations 44 in predetermined relationship with the sensing fingers. Upon movement of the tape past the sensing fingers in the direction indicated by the arrow, whenever a perforation 44 moves beneath a sensing finger an electrical circuit is completed energizing the respective actuating coil.

The actuating coils constitute the input to a variable impedance translating or interpreting network 45 including a plurality of series switches connected to be operated by actuating coils A, B, C and D, respectively. In particular, series of switches $a1$ through $a16$ are operated by actuating coil A, series of switches $b1$ through $b8$ are operated by actuating coil B, series of switches $c1$ through $c4$ are operated by actuating coil C, and series of switches $d1$ and $d2$ are operated by actuating coil D. Each series includes normally open and normally closed switches, and upon energization of the actuating coils, the switches of respective series will change state, such as from the condition shown to the opposite condition. The series of switches are connected to the conductor 43 through an ambiguity resolving switch 46, and a conductor 47. The resolving switch 46 is operated by a cam 48 driven by the motive means 40 of the memory device 30. The arrangement is such that the switch 46 is moved to closed position a short interval following movement of a sensing finger into engagement with a respective contact, and is moved to open position a short interval before a sensing finger terminates engagement with a respective contact. Thus the sensing fingers affect energization of respective actuating coils before the conductor 43 is connected to the interpreting network. The interpreting network 45 also includes output conductors $I_1$ through $I_{16}$ connected to switches $a1$ through $a16$, respectively. The series of switches of the interpreting network are connected in the manner shown so that for any particular energization pattern of the coils A, B, C and D, as determined by the tape perforations 44, a unique circuit is completed from the conductor 43, through the appropriate switches of the series of switches to one of the output conductors $I_1$ through $I_{16}$.

The output conductors $I_1$ through $I_{16}$ of the interpreting network are connected to decision units 10 through 25, respectively. In FIGURE 1 only decision units 10 and 25 are shown connected to their respective output conductors $I_1$ and $I_{16}$ of the interpreting network through conductors 49 and 50, respectively. It is to be expressly understood that the remaining output conductors $I_2$ through $I_{15}$ are connected to decision units 11 through 24, respectively, the decision unit X representing these intermediate decision units. The decision units may be of similar construction in which corresponding elements are designated by similar reference characters prefixed by a numerical reference character indicating the decision unit including such elements. Consequently, a description of decision unit 10 will also comprise an adequate description of decision units 11 through 25.

Figure 3:
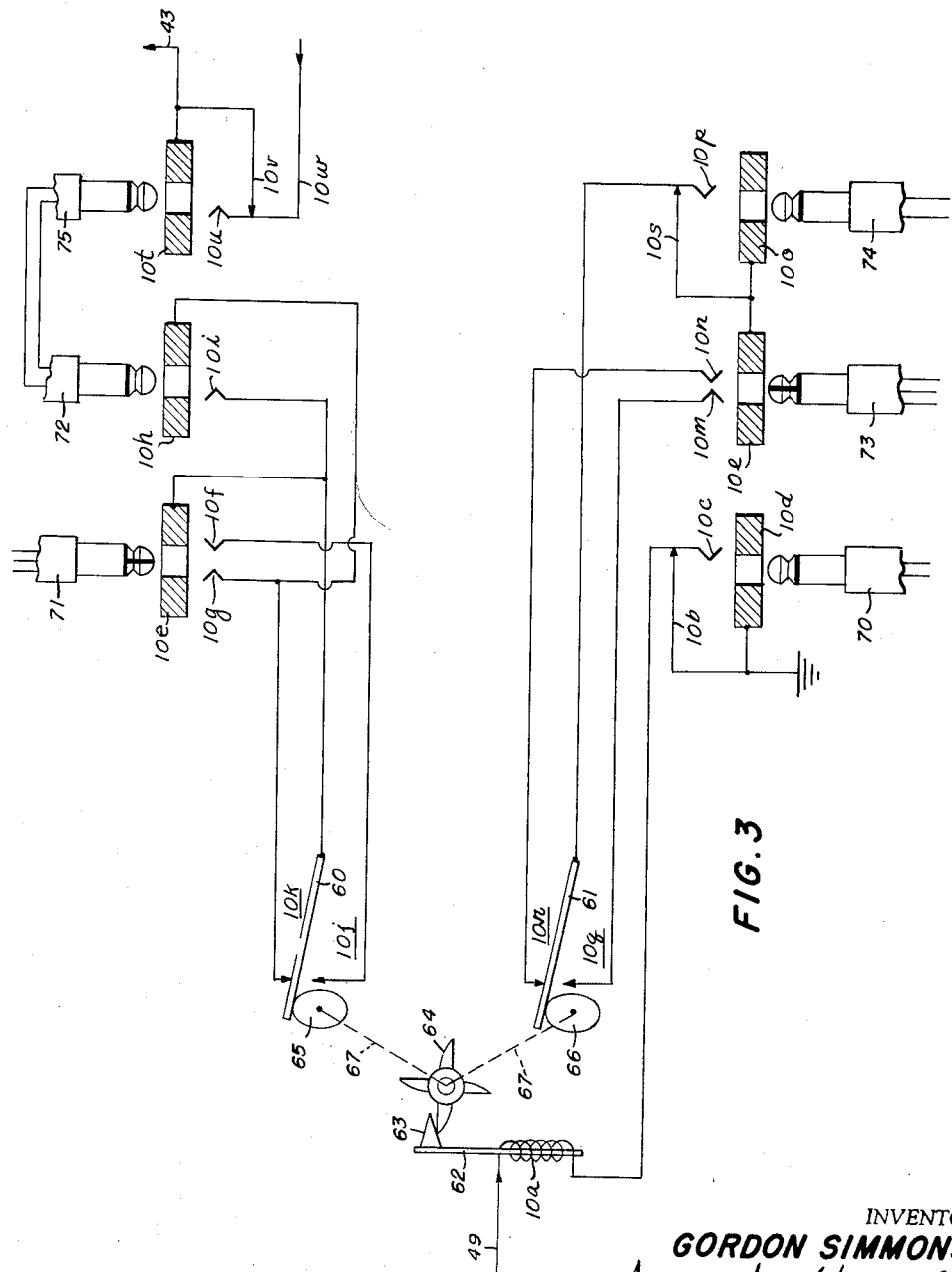
FIGURE 3 is a diagrammatic showing of a decision unit provided by the present invention.

As shown more clearly in FIGURE 3, the decision unit 10 includes an electromagnetic actuating coil 10a connected to the output conductor $I_1$ through conductor 49 and to ground potential through a normally closed switch 10b associated with a contact 10c of a jack 10d. The decision unit also includes a jack 10e having a pair of contacts 10f and 10g, and a jack 10h associated with a single contact 10i. The jack 10e and the contact 10i are connected to a common contact 60 of normally open switch 10j and normally closed switch 10k, the other contact of the switch 10j being connected to the contact 10f and the other contact of the switch 10k being connected to the contact 10g and the jack 10h. In addition, the decision unit includes a jack 10l having contacts 10m and 10n, and jack 10o having a contact 10p and a normally closed switch 10s connected to the jacks 10l and 10o. The contact 10p is connected to a common contact 61 of normally open switch 10q and normally closed switch 10r, the other contacts of switches 10q and 10r being connected to contacts 10m and 10n, respectively, of jack 10l. Furthermore, the decision unit includes jack 10t having a single contact 10u and a normally closed switch 10v connected to the jack 10t.

The electromagnet actuating coil 10a surrounds an armature 62 having an operating member 63. The operating member 63 is adapted to rotate a ratchet wheel 64 in one direction, such as a counterclockwise direction, upon downward movement of the armature 62 when energizing current is applied to the coil 10a. The wheel 64 is mounted on a shaft carrying cams 65 and 66, the shaft being shown by the broken line 67. The cams 65 and 66 function to actuate switches 10k, 10j and 10q, 10r, respectively, upon each energization of the actuating coil 10a. For this purpose the cams 65 and 66 are of elliptical shape and are positioned to engage the common contacts 60 and 61, respectively, and alternately open and close switches 10j, 10k and 10q, 10r upon each 90° of rotation of the wheel 64. The wheel 64 is designed to be rotated approximately 90 degrees in a counter-clockwise direction upon each energization of the actuating coil 10a and a release mechanism (not shown) is provided to permit the armature 62 to return to its unenergized position shown without affecting rotation of the wheel 64. Thus, upon energization of the actuating coil 10a the switches 10j, 10k and 10q, 10r will change from closed or opened position as the case may be, and will remain in their changed position until the actuating coil 10a is again energized.

The jacks 10d, 10e, 10h, 10l, 10o and 10t may be provided with male plugs 70 through 75, respectively, the male plugs being shown in non-inserted position with respective jacks for the sake of clarity. The normally closed switches 10b, 10s and 10v are moved to open position upon insertion of a male plug in respective jacks 10d, 10o and 10t. The single contact jacks 10d, 10h, 10o and 10t are adapted to receive male plugs for carrying two wire circuits, while the two contact jacks 10e and 10l are adapted to receive male plugs forming three wire circuits. It is to be understood, however, that jacks provided with additional contacts, and cooperating male plugs, may be employed if desired.

When the decision units are connected in the manner illustrated in FIGURE 1, the switches 10v through 25v are wired in series with the supply circuit for the motive means 40 of the memory device 30 by means of conductors 10w through 25w with the conductor 43 being connected to contact 10u of decision unit 10. It will be apparent that if any one of the switches 10v through 25v is open, the energization circuit for the motive means 40 will be interrupted. Thus, if a male plug is inserted in any of the jacks 10t through 25t, such as plug 75 being inserted in jack 10t, a circuit must be completed between the terminals of the inserted male plug before the motive means is energized. If interconnected male plugs 72 and 75 are inserted in jacks 10h and 10t of decision unit 10, or in corresponding jacks of any of the other decision units, the continuity of the energization circuit of the motive means 40 may be controlled by the normally closed switch 10k, and when switch 10k is open, by an external circuit connected to plug 71 inserted in the jack 10e.

Jacks 10o through 25o are intended primarily as power supply connections. When a male plug is inserted in any of these jacks, such as male plug 74 being inserted in jack 10o, the corresponding switches 10s through 25s will open. If the conductors of the male plug 74, or corresponding male plugs, are connected to a suitable power supply, power will then be available at the contacts of the jacks 10l through 25l, such as contacts 10m and 10n, for the application to external circuits which may include plant operating units or servo-mechanisms. When the jacks 10h through 25h are not connected to the jacks 10t through 25t, and when the jacks 10o through 25o are not used as power supply connections, the conductors of these jacks may be used passively to open and close circuits which may include other decision units or the ultimate devices to be controlled.

In general, the jacks 10d through 25d may be utilized to determine whether the response of the decision units to the energizing signals applied from the interpreting network 45 will be instantaneous, delayed, or inhibited. When male plug 70 is inserted in jack 10d of decision unit 10, for example, the associated switch 10b opens and the continuity of the circuit of the actuating coil 10a is determined by circuits to which the plug 70 is connected. The jacks 10e through 25e are provided primarily to receive feedback signals from external circuits, such as plant instruments associated with the load devices fed through the jacks 10l through 25l, or timing devices, for example. The jacks 10e through 25e may be interconnected with other jacks of the same decision unit or of other decision units.

From the foregoing, it will be apparent that the decision units may perform any of the following functions:

(a) Carry out the instructions from the memory device responsively to excitatory signals from the interpreting network.

(b) Stop the reading out of instruction codes from the memory device for a predetermined time or until predetermined conditions occur.

(c) Ignore the instructions from the memory device or ignore the instructions for a predetermined time or until predetermined conditions occur.

(d) Inhibit the response of other decision units.

(e) Delay the response of other decision units.

Figure 4:
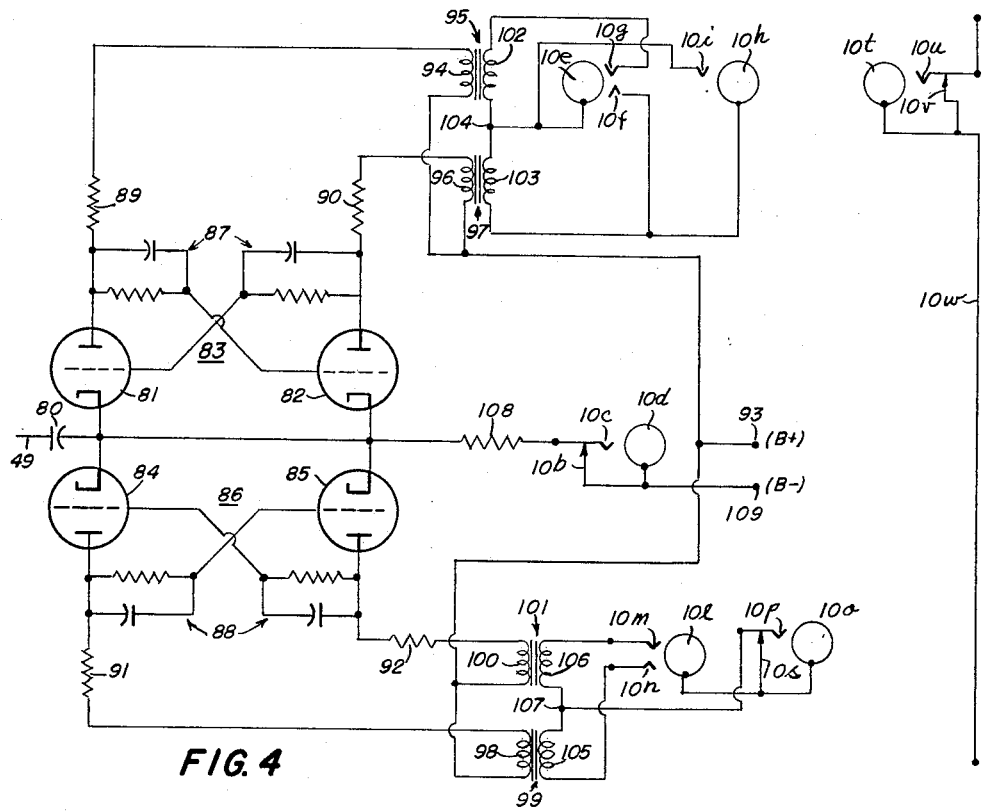
FIGURE 4 is a circuit diagram of a modified form of decision unit provided by the present invention.

The present invention also provides an electronic decision unit which may be used in place of the electro-mechanical decision unit shown in FIGURE 3. With reference to FIGURE 4, an electronic decision unit, such as decision unit 10, is shown including certain elements similar to elements of the electro-mechanical decision unit, the similar elements being identified by similar reference characters. In particular, the electronic decision unit includes jack 10d provided with contact 10c and associated switch 10b, jack 10e provided with contacts 10f and 10g, jack 10h provided with contact 10i, jack 10l provided with contacts 10m and 10n, jack 10o provided with contact 10p and associated switch 10s, and jack 10t provided with contact 10u and associated switch 10v. The conductor 49 from the output conductor $I_1$ of the interpreting network 45 feeds an excitatory signal through coupling condenser 80 to cathodes of tubes 81 and 82 of a flip-flop circuit 83 and to cathodes of tubs 84 and 85 of a flip-flop circuit 86. The flip-flop circuits 83 and 86 include conventional cross-coupled resistance-capacitance networks 87 and 88, respectively, while the anode circuits of tubes 81 and 82 include load resistors 89 and 90 respectively, and the anode circuits of tubes 84 and 85 include load resistors 91 and 92, respectively. The anodes of the tubes 81, 82, 84 and 85 are connected through their respective load resistances and input windings of saturable reactors to a B+ supply 93. In particular, the anode circuit of the tube 81 includes the load resistor 89 and input winding 94 of saturable reactor 95, the anode circuit of the tube 82 includes the load resistance 90 and input winding 96 of saturable reactor 97, the anode circuit of the tube 84 includes the load resistance 91 and input winding 98 of saturable reactor 99, and the anode circuit of the tube 85 includes the load resistance 92 and input winding 100 of saturable reactor 101. Output windings 102 and 103 of saturable reactors 95 and 97, respectively, are connected together at one of their ends at point 104 which in turn are connected to jack 10e and to contact 10i of jack 10h, the other ends of the output windings 102 and 103 being connected to contact 10g, and to contact 10f and jack 10h, respectively. Output windings 105 and 106 of saturable reactors 99 and 101, respectively, are also connected together at one of their ends at point 107 having a connection with the contact 10p of jack 10o, while the opposite ends of output windings 105 and 106 are connected to contacts 10n and 10m, respectively, of jack 10l. The cathodes of the tubes 81, 82, 84 and 85 are serially connected through a common load resistance 108 and switch 10b of jack 10d to a B− supply 109. The grids of the tubes may be provided with bias resistors, not shown, connected to the B− supply 109. The saturable reactors 95, 97, 99 and 101 perform the functions of switches 10k, 10j, 10r and 10q of the decision unit 10 shown in FIGURE 3, while the flip-flop circuits 83 and 86 combine to perform the function of the actuating coil 10a, armature 62, ratchet wheel 64 and cams 65 and 66 in operating the switches 10k, 10j, 10r and 10q.

The saturable reactors 95, 96, 99 and 101 are saturated upon passing an appropriate direct current through their respective control windings and present a very low impedance to alternating currents flowing therethrough, when unsaturated, the reactors present a high impedance. Thus, the reactors constitute impedance devices capable of being placed in stable high or low impedance states. Under quiescent conditions one tube of each of the flip-flop circuits will be conductive and the other tube non-conductive. Thus the reactor associated with the conductive tube will be saturated and the reactor associated with the non-conductive tube will not be saturated. When a negative pulse is applied through conductor 49 and coupling condenser 80 to the cathodes of the tubes, a reversal of the conducting and non-conducting states of the tubes occurs. This action results in a reversal of the high and low impedance states of the saturable reactors. Since the flip-flop circuits 85 and 86 are of the driven type, that is, a change in conduction of their tubes only occurs responsively to application of a triggering pulse to the cathodes, the impedance state of the reactors will remain stable as determined by the last applied excitatory signal until the next excitatory signal is applied from the interpreting network.

Figure 5:
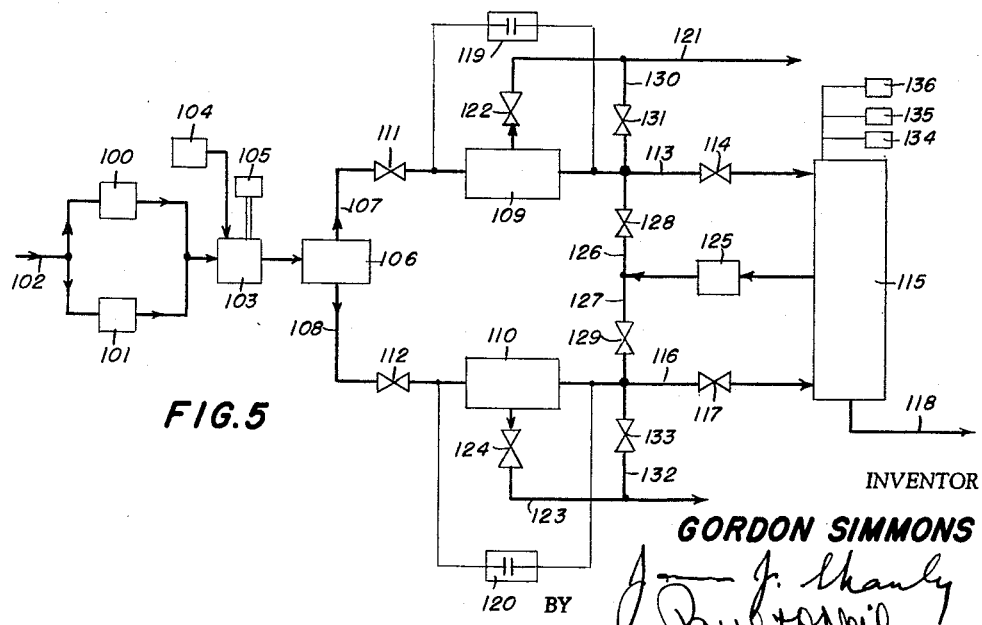
FIGURE 5 is a flow diagram of an industrial plant which may be controlled by the novel method and apparatus provided by the present invention.

FIGURE 5 of the drawings illustrates a flow diagram of an industrial plant that may be controlled by employing the novel method and apparatus provided by the present invention. It is to be expressly understood that the industrial plant of FIGURE 5 is disclosed merely as an aid in describing an operating example of the present invention, and it is not to be construed as being the only type of industrial plant to which the principles of the present invention are applicable or as being typical of only one class of industrial plants capable of being controlled by the novel method and apparatus described above. As shown, two pumps 100 and 101 are arranged to pump liquid supplied from an external source through conduit 102. Liquid is discharged from the pumps into a mixing tank 103 where chemicals may be added by an automatic proportional feeding device 104 and mixed with the liquid by a mixing device 105. From the mixing tank the liquid flows into a sedimentation tank 106, from which the liquid may be withdrawn through separate streams by way of conduits 107 and 108 connected to filters 109 and 110, respectively, the conduits 107 and 108 being provided with control valves 111 and 112, respectively. Liquid from the filter 109 is passed through conduit 113 and control valve 114 to the upper end of a storage tank 115, and liquid from the filter 110 is fed through conduit 116 and control valve 117 and introduced into the lower end of the storage tank. Liquid is withdrawn from the plant through conduit 118 connected to the lower end of the storage tank. The filters 109 and 110 are provided with associated switches 119 and 120, operated by differential pressure gages, not shown, for measuring the pressure drop across the filters, to provide an indication when the filters require purging by a backwashing operation. The filters 109 and 110 are also provided with drain outlets including conduit 121 and drain valve 122, and conduit 123 and drain valve 124, respectively. A wash pump 125 is provided having its inlet connected to the storage tank and its outlet connected by conduits 126 and 127 and control valves 128 and 129 to the filter outlet conduits 113 and 116. A conduit 130 including a control valve 131 is connected between outlet conduit 113 and drain conduit 121 of filter 109, and a conduit 132 including a control valve 133 is connected between outlet conduit 116 and drain conduit 123 of filter 110. This arrangement permits backwashing of either or both of the filters. The storage tank 115 is provided with a liquid level measuring system (not shown) for actuating switches 134, 135 and 136 depending upon the level of liquid in the storage tank, the switch 134 indicating a low liquid level, the switch 135 an intermediate liquid level and the switch 136 a high liquid level. For a purpose that will appear below, the switches 135 and 136 may be provided in duplicate.

Operating instructions for a plant of the type illustrated in FIGURE 5 may be as follows:

(1) When tank 115 is full, the pump 100 or 101 supplying raw liquid is shut off, the filter control valves 114 and 117 are closed, and operation of the chemical feeder 104 and the mixing device 105 is terminated.

(2) When the liquid in tank 115 drops to a first predetermined level, one of the pumps 100 and 101 is started (alternating the pumps so that each pump runs approximately the same number of hours), operation of the chemical feeder 104 and the mixing device 105 is initiated, and the filter control valves 114 or 117 and the inlet valves 111 or 112 are opened (alternating the pairs of valves so that the filters carry equal loads). If a filter has been backwashed during the previous operating period, the unwashed filter is used until backwashing is required.

(3) If the liquid in the storage tank 115 drops to a second predetermined level, below the first predetermined level, the other pump 100 or 101 is started and respective inlet valves 111 or 112 and filter control valves 114 or 117 are opened so that both pumps and both filters are operating. Backwash either filter only when liquid in tank 115 is above the second predetermined level, even though purging is required as indicated by pressure drop across filter.

(4) When switch 119 or 120 closes responsively to a predetermined pressure drop across respective filter, backwash the filter as follows (assuming filter 109 requires purging):

(a) Open control valve 117.
(b) Close control valve 114.
(c) Close inlet valve 111.
(d) Open inlet valve 112.
(e) Open drain valve 122.
(f) Start wash pump 125.
(g) Open wash valve 128.
(h) Backwash filter 109 for 10 minutes.
(i) Close wash valve 128.
(j) Stop wash pump 125.
(k) Close drain valve 122.
(l) Open inlet valve 111.
(m) Open rewash valve 131.
(n) Allow process liquid to flow through filter 109 and out through drain conduit 121 for 5 minutes.
(o) Close rewash valve 131.
(p) Close inlet valve 111.

The tape 39 shown in FIGURE 2 includes perforations 44 positioned in such a manner as to provide instruction codes to affect operation of the industrial plant illustrated in FIGURE 5 in the manner described above. The perforations of the tape 39 are arranged in transverse code groups, and as each group passes under the sensing fingers 31, 32, 33 and 34, the switches of the interpreting network 45 will be energized in such a manner as to supply an excitatory signal to one decision unit of the decision units 10 through 25, as determined by the code. The numerical identification of the decision unit selected in response to each of the code groups is shown along the edge of the tape in order to aid in describing operation of the system.

FIGURES 6A, 6B, 6C and 6D viewed together illustrate a group of decision units, such as decision units 11 through 25, interconnected in such a manner as to affect the desired control of the industrial plant of FIGURE 5. The decision units are the type illustrated in FIGURE 3, however, it is to be understood decision units of the type shown in FIGURE 4 may be employed, if desired. The decision units are connected together and to components of the system and the industrial plant in the following manner:

Decision unit 11

A plug connected to the switch 136 is inserted in jack 11e connecting the switch 136 in parallel with switch 11k through conductors 200 and 201. Connected plugs are inserted in jacks 11h and 11t connecting jacks 11h and 11t through conductor 202 and contacts 11u and 11i through conductor 203, the plug in jack 11t opening switch 11v. A plug is inserted in jack 11o connecting jack 11o and contact 11p to power supply buses 204 and 205 through leads 206 and 207, the plug in the jack 11o opening switch 11s. A plug is inserted in jack 11l connecting chemical feeder 104 and mixing device 105 in parallel with jack 11l and contact 11n through conductors 208 and 209. Switch 11v is connected to conductor 41 feeding motive device 40, and contact 11u is connected by lead 11w to switch 12v of decision unit 12.

Decision unit 12

A plug is inserted in jack 12l connecting contact 12m to contact 13c of decision unit 13 through conductor 210, and contact 12n to contact 14c of decision unit 14 through conductor 211. A plug is inserted in jack 12o connecting contact 12p to bus 205 through lead 212 and opening switch 12s. Switch 12v is connected to lead 11w and contact 12u is connected to lead 12w.

Decision unit 13

A plug is inserted in jack 13d connecting contact 13c to conductor 210 as described above, and opening switch 13b. A plug is inserted in jack 13l connecting contact 13m to pump 100 through conductor 213, the circuit for the pump 100 being completed through the conductor 208. A plug is inserted in jack 13o connecting contact 13p to bus 204 through lead 214, and opening switch 13s. Switch 13v is connected to lead 12w and contact 13u is connected to lead 13w.

Decision unit 14

A plug is inserted in jack 14d connecting contact 14c to conductor 211 as described above, and opening switch 14b. A plug is inserted in jack 14l connecting contact 14m to pump 101 through a conductor 215, the circuit for the pump 101 being completed through the conductor 208. A plug is inserted in jack 14o connecting contact 14p to bus 204 through a conductor 216, and opening switch 14s. Switch 14v is connected to the lead 13w, and contact 14u is connected to a lead 14w.

Decision unit 15

A plug is inserted in jack 15l connecting contact 15m to a conductor 217, and connecting contact 15n to a conductor 218. A plug is inserted in jack 15o connecting contact 15p to bus 205 through lead 219, and opening switch 15s. Switch 15v is connected to the lead 14w, and contact 15u is connected to a lead 15w.

Decision unit 16

A plug is inserted in jack 16d connecting contact 16c to conductor 217 through a lead 220, and opening switch 16b. A plug is inserted in jack 16e connecting contact 16f to a conductor 221 and jack 16e to jack 17e of decision unit 17 through a conductor 222. A plug is inserted in jack 16l connecting contact 16m to control valve 114 through conductor 223, the circuit for control valve 114 being completed through conductor 208. A plug is inserted in jack 16o connecting contact 16p to bus 204 through lead 224, and opening switch 16s. Switch 16v is connected to the lead 15w and contact 16u is connected to a lead 16w.

Decision unit 17

A plug is inserted in jack 17d connecting contact 17c to conductor 218 through lead 225, and opening switch 17b. A plug is inserted in jack 17e connecting contact 17f to a conductor 226 and the jack 17e to the conductor 222 as described above. A plug is inserted in jack 17h connecting contact 17i to bus 204 through lead 227. A plug is inserted in jack 17l connecting contact 17m to valve 117 through a conductor 228, the circuit for the valve 117 being completed through conductor 208. A plug is inserted in jack 17o connecting contact 17p to bus 204 through lead 229, and opening switch 17s. Switch 17v is connected to the lead 16w and contact 17u is connected to a lead 17w.

Decision unit 18

A plug is inserted in jack 18e connecting switches 119A, 120A and 135 in parallel with the jack 18e and contact 18g by conductors 230 and 231. Plugs are inserted in jacks 18h and 18t connecting jacks 18h, 18t and contacts 18i, 18u by conductors 232 and 233, respectively, and opening the switch 18v. Switch 18v is connected to the lead 17w and the contact 18u is connected to lead 18w.

Decision unit 19

A plug is inserted in jack 19e connecting switch 134 in parallel with the jack 19e and contact 19g through conductors 234 and 235. Plugs are inserted in jacks 19h and 19t connecting contacts 19i, 19u and jacks 19h, 19t by conductors 236 and 237, respectively, and opening switch 19v. Switch 19v is connected to the lead 18w, and contact 19u is connected to a lead 19w.

Decision unit 20

A plug is inserted in jack 20d opening switch 20b and connecting contact 20c to conductor 217 through lead 238 and switch 239. A plug is inserted in jack 20e connecting the jack 20e to jack 21e of decision unit 21 through a conductor 240, and connecting contact 20f to a conductor 241. A plug is inserted in jack 20l connecting contact 20m to a conductor 242. A plug is inserted in jack 20o, opening switch 20s and connecting contact 20p to bus 205 through conductor 243. Switch 20v is connected to the lead 19w and the contact 20u is connected to a lead 20w.

Decision unit 21

A plug is inserted in jack 21d, opening switch 21b, and connecting jack 21d to the conductor 240 through a lead 244 and connecting contact 21c to conductor 218 through lead 245 and switch 246. A plug is inserted in jack 21e connecting the jack 21e to conductor 240, and connecting contact 21f to conductor 241 through a conductor 248. A plug is inserted in jack 21l connecting the jack 21m to a conductor 249. A plug is inserted in jack 21o, opening switch 21s and connecting contact 21p to bus 205 through conductor 250. Switch 21v is connected to lead 20w and contact 21u is connected to a lead 21w.

Decision unit 22

A plug is inserted in jack 22d to connect the contact 22c to the conductor 241 through a conductor 251, while opening the switch 22b. A plug is inserted in jack 22l, connecting contact 22m to drain valves 122 and 124 and to control valves 128 and 129, through a conductor 252. A plug is inserted in jack 22o connecting contact 22p to bus 204 through a conductor 253, while opening switch 22s. Switch 22v is connected to lead 21w and the contact 22u is connected to a lead 22w.

Decision unit 23

A plug is inserted in jack 23d connecting contact 23c to the conductor 240, while opening switch 23b. A plug is inserted in jack 23e connecting a timer switch 255 across jack 23e and contact 23g through leads 256 and 257, and connecting contact 23f to timer motor 258 through a conductor 259. Plugs are inserted in jacks 23h and 23t connecting jack 23t to jack 23h through lead 260 and connecting contact 23u to contact 23i through lead 261 while opening switch 23v. A plug is inserted in jack 23l connecting contact 23m to wash pump 125 through a conductor 262. A plug is inserted in jack 23o, opening the switch 23s, and connecting contact 23p to bus 204 through a lead 263, and connecting jack 23l to bus 205 through a lead 264. Switch 23v is connected to lead 22w and contact 23u is connected to a lead 23w.

*Decision unit 24*

A plug is inserted in jack 24d connecting contact 24c to the conductor 242 through a lead 265, and opening switch 24b. A plug is inserted in jack 24e connecting a timer switch 266 across the jack 24e and contact 24g through leads 267 and 268, and connecting contact 24f to timer motor 269 through a conductor 270. Plugs are inserted in jacks 24h and 24t connecting the jacks 24h and 24t through a conductor 271, and connecting contacts 24i and 24u through a conductor 272, the plug in the jack 24t opening the switch 24v. A plug is inserted in jack 24l connecting contact 24m to control valves 111 and 131 through a conductor 273. A plug is inserted in jack 24o connecting contact 24p to bus 204 through a conductor 274, and opening the switch 24s. Switch 24v is connected to the lead 23w and contact 24u is connected to a lead 24w.

*Decision unit 25*

A plug is inserted in jack 25d connecting contact 25c to the conductor 249 through a lead 275, and opening the switch 25b. A plug is inserted in jack 25e connecting jack 25e, contact 25f and contact 25g to jack 24e, contact 24f and contact 24g of decision unit 24 through leads 276, 277 and 278, respectively. Plugs are inserted in jacks 25h and 25t connecting the jacks 25h and 25t by a conductor 279 and contacts 25i and 25u by a conductor 280, the plug in jack 25t opening switch 25v. A plug is inserted in jack 25l connecting contact 25m to control valves 112 and 133 through a conductor 281. A plug is inserted in jack 25o connecting contact 25p to bus 204 through conductor 282, and opening the switch 25s. Switch 25v is connected to lead 24w and the contact 25u is connected to the bus 204 through a lead 25w.

Figure 6A:
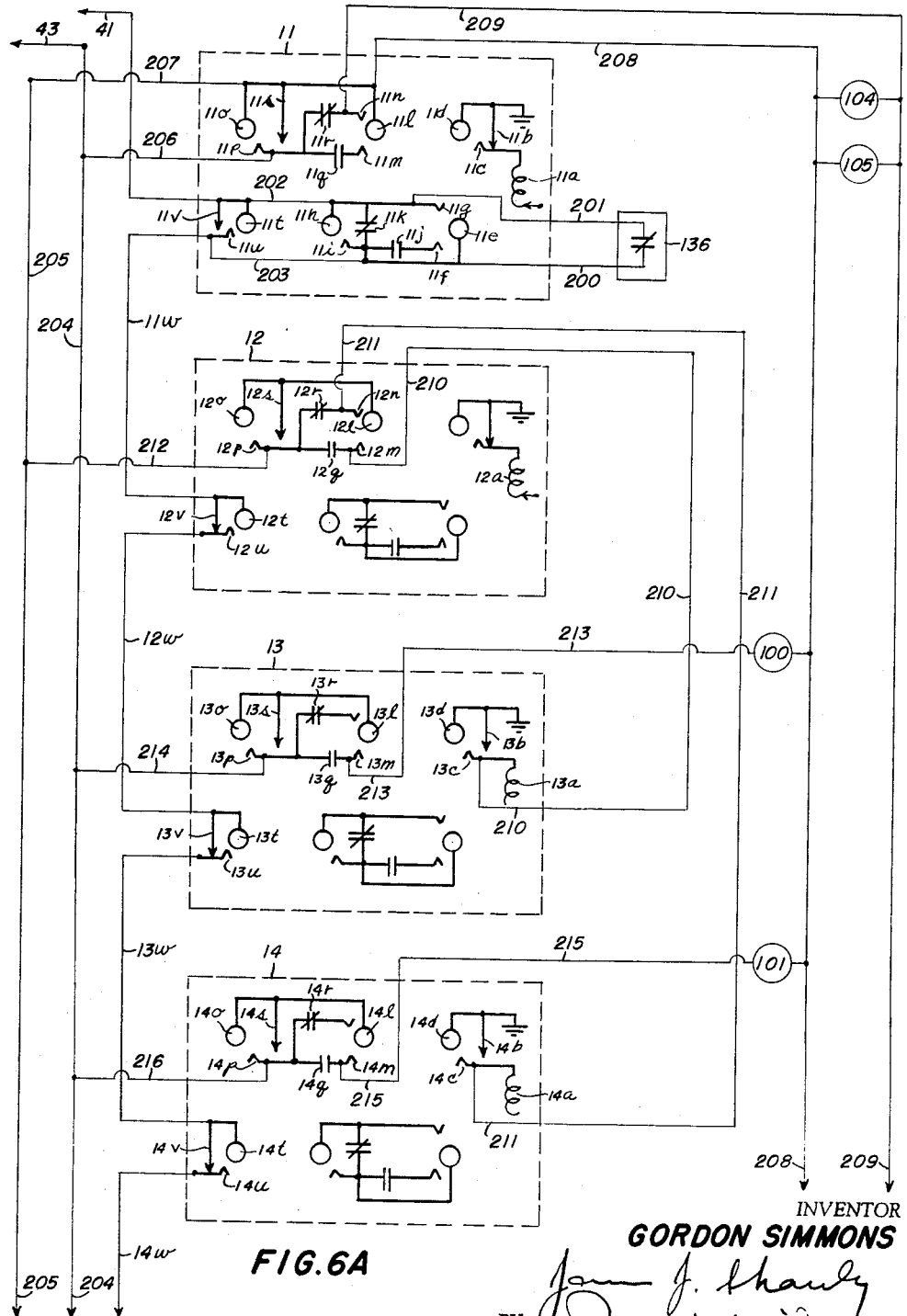
FIGURES 6A, 6B, 6C and 6D constitute a schematic diagram illustrating application of the novel system of the invention to control the industrial plant illustrated in FIGURE 5.
Figure 6B:
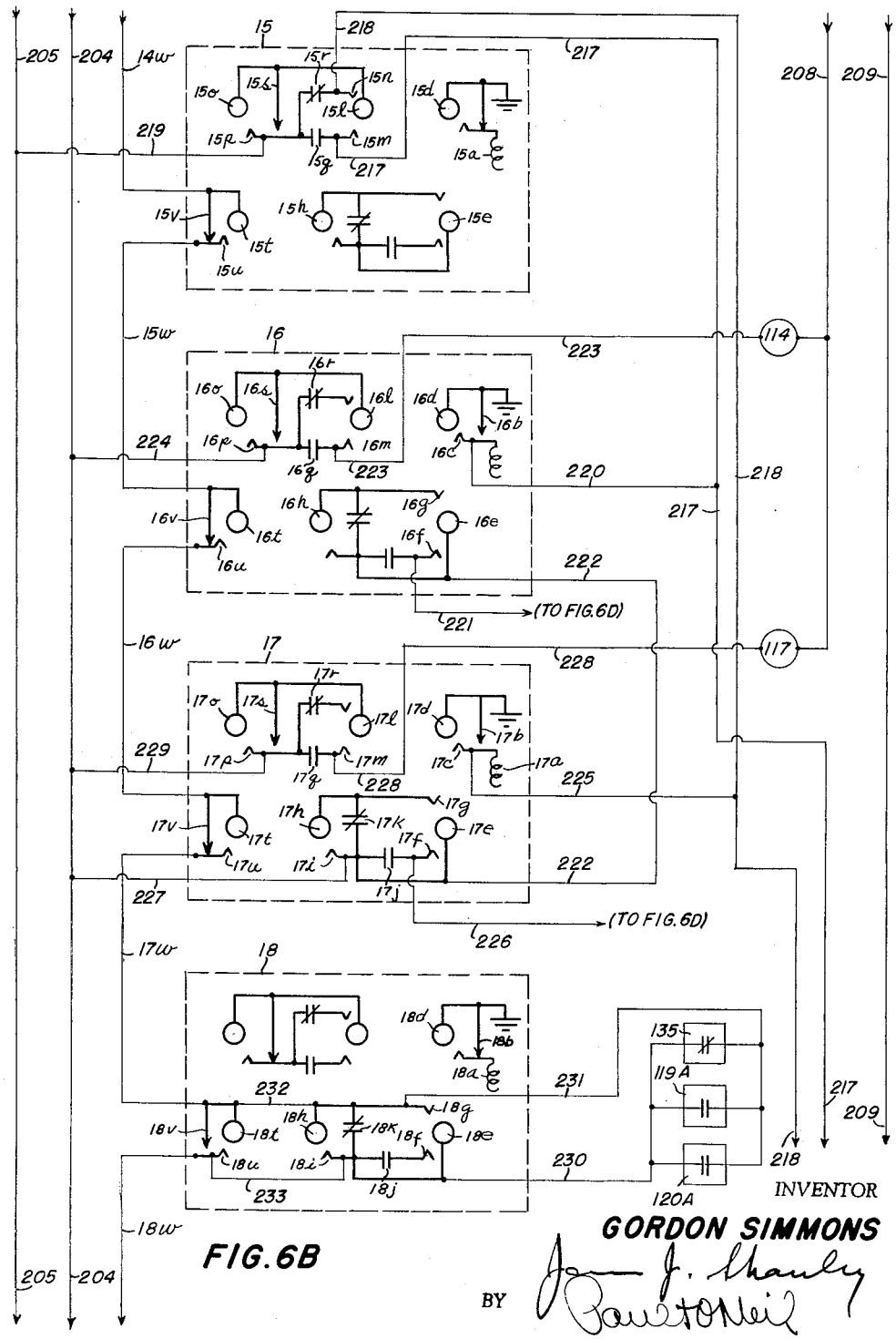
Figure 6C:
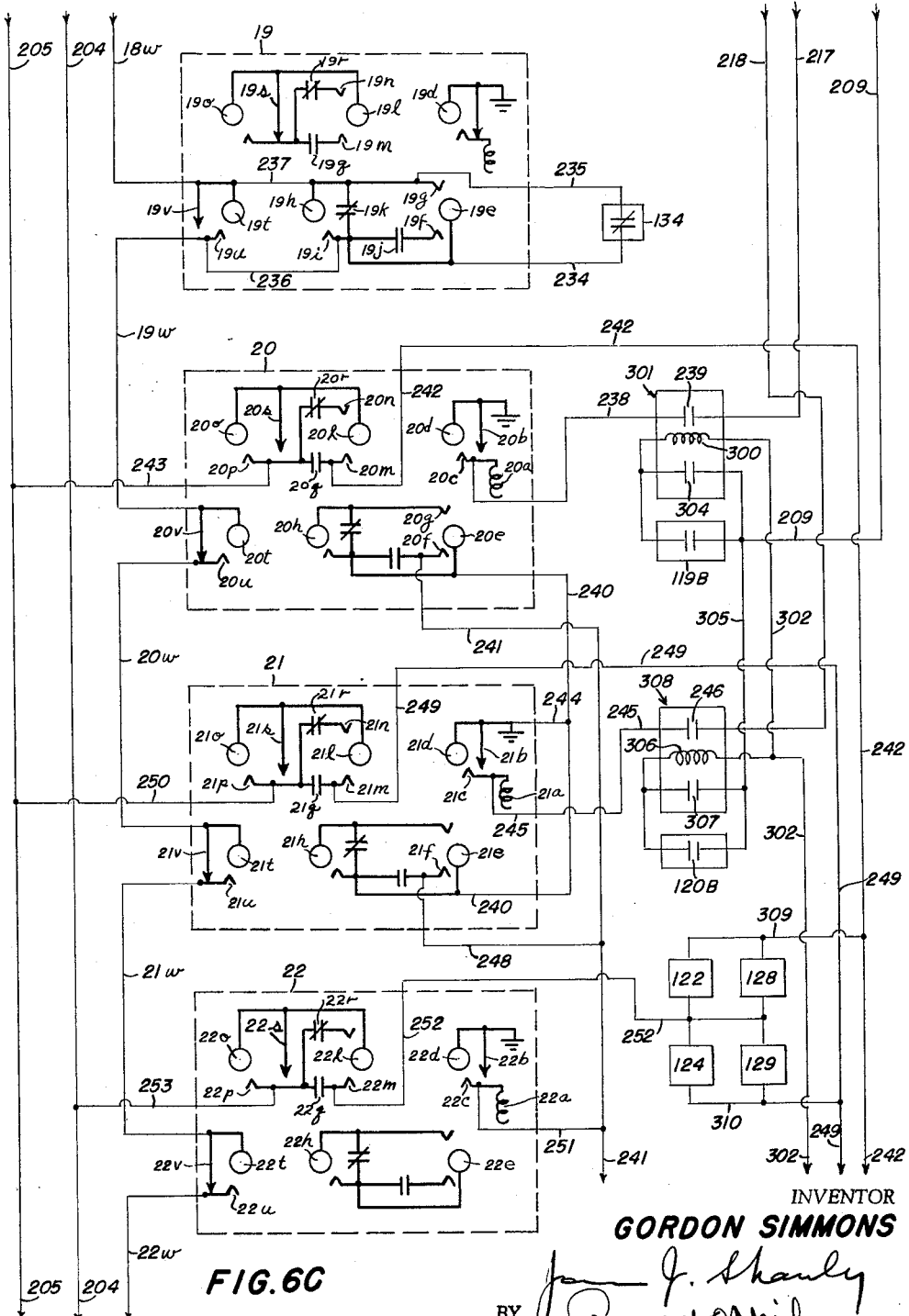
Figure 6D:
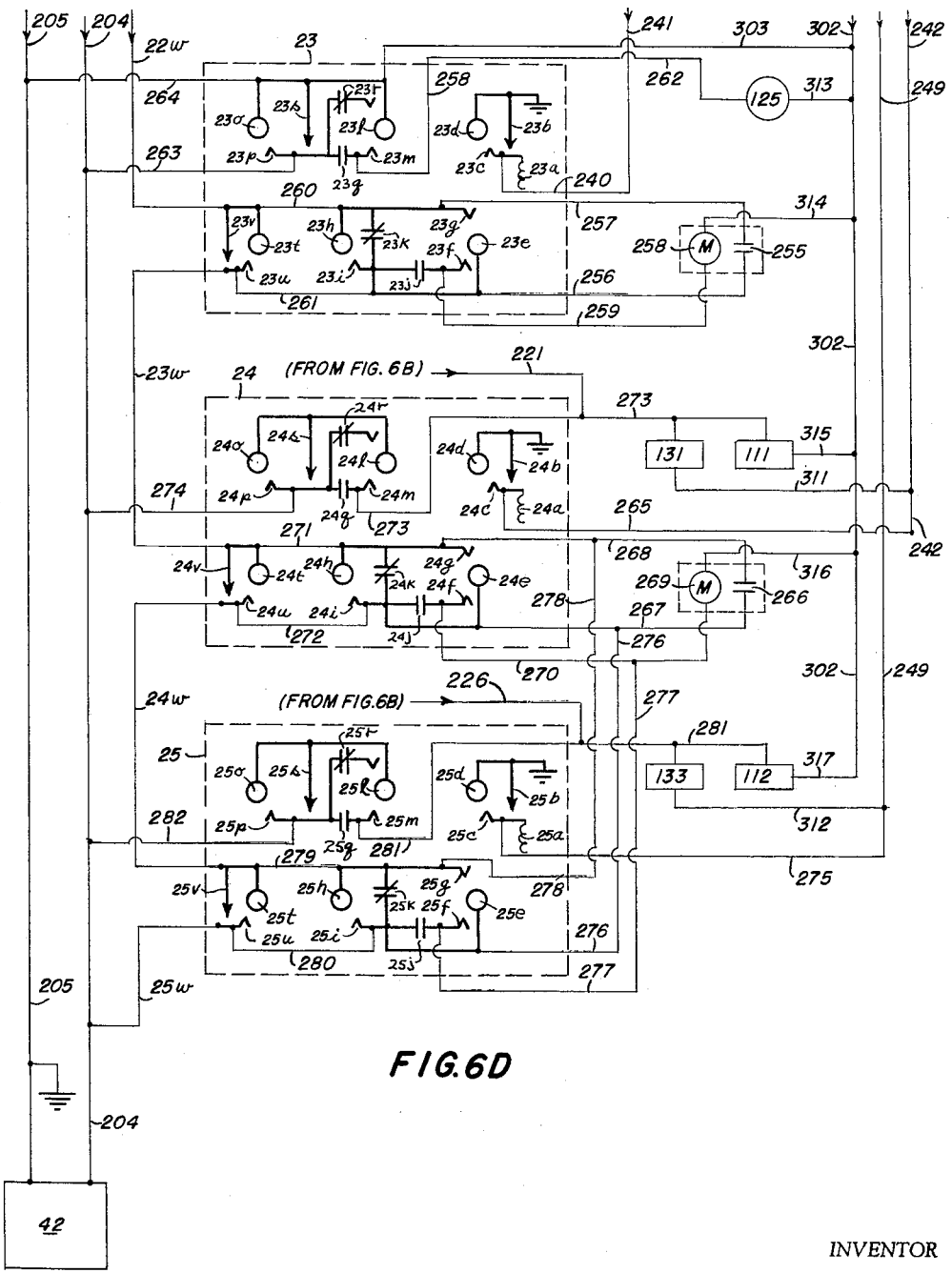

As shown in FIGURE 6C, one contact of the switch 119B is connected to the conductor 209 while its other contact is connected through an actuating coil 300, of relay 301, conductors 302 and 303 and decision unit 23 to the bus 205 (see FIGURE 6D). The relay 301 includes a holding circuit switch 304 to place opening of the switch 239 under control of the decision unit 11. The switch 120B is connected in a similar manner with the conductor 209, through a lead 305, and with an actuating coil 306 and a holding circuit switch 307 of a relay 308 including the switch 246. The circuits for the drain valve 122 and the control valve 128 are completed to the conductor 242 through a connector 309, while the circuits for the drain valve 124 and the control valve 129 are completed through a connector 310 joined to the conductor 249. With reference to FIGURE 6D, the circuit for the control valve 131 is completed through a lead 311 connected to the conductor 242, and the circuit for the control valve 133 is completed through the conductor 249 by way of a connector 312. The circuits for the wash pump 125, the timer motor 258, the control valve 111, the timer motor 269 and the control valve 112 are all completed through the conductor 302, by way of connectors 313, 314, 315, 316 and 317, respectively. Conductor 221, connected to contact 16f of decision unit 16 (FIGURE 6B) is joined to the conductor 273 connected to the contact 24m of decision unit 24 (FIGURE 6D). Also, conductor 226 joined to the contact 17f of decision unit 17 (FIGURE 6B) is connected to conductor 281 joined to contact 25m of decision unit 25 (FIGURE 6D). For the sake of clarity, the conductors 221 and 226 are not shown on the intermediate FIGURE 6C illustrating decision units 19, 20, 21 and 22. In addition, switches 119 and 120 of FIGURE 5 each comprise two independent switches or poles operated responsively to a common pressure sensing mechanism. In particular, the switch 119 includes switches 119A and 119B operating responsively to the pressure head across the filter 109, and the switch 120 includes switches 120A and 120B operating responsively to the pressure head across the filter 110.

The switches 11v through 25v of the decision units are connected in series between the voltage source 42 and the motive means 40 of the memory device 39 by means of conductors 11w through 25w and the conductor 41. The voltage source 42 is also connected to positive bus 205 and negative bus 204, and the bus 204 is connected to the conductor 43 feeding the sensing circuits of the memory device and the ambiguity resolving switch 46 as shown in FIGURE 1.

With the switches of the interpreting network 45 in their various states as shown in FIGURE 1, upon movement of the sensing fingers into the first group of coded perforations of the tape 39, as shown in FIGURE 2, an excitatory signal is fed to the output conductor $I_2$ and the decision unit 11 is energized opening switches 11k and 11r. Opening of the switch 11r interrupts voltage supply to the chemical feeder 104 and the mixing device 105, while opening of the switch 11k places the switch 136 in the power circuit of the motive means 40. If the tank 115 is filled with liquid to above a predetermined level, the switch 136 will be open and the memory device 30 will be deenergized terminating movement of the tape relative to the sensing fingers. The system will remain in this state until the quantity of liquid withdrawn from the tank 115 through conduit 118 lowers the level of the liquid in the tank to below a first predetermined level resulting in closing of the switch 136. When the switch 136 closes power is supplied to the motive means 40 and the tape is moved relative to the sensing fingers. As the sensing fingers move past the first group of coded perforations, decision unit 11 is deenergized, however, since the decision units are bi-stable devices, the decision unit 11 will remain in its then existing state with switches 11k and 11r open. As seen from FIGURE 2, as the next code group moves into contact with the sensing fingers, decision unit 11 is returned to its original state wherein switches 11k and 11r are closed. This action maintains energization of the motive means 40 and establishes a circuit between the power supply 42 and the chemical feeder 104 and the mixing device 105.

As the tape continues to move past the sensing fingers, excitatory signals from the interpreting network are successively applied to decision units 13, 14, 16, and 17, as seen from the groups of coded perforations on the tape. Of decision units 13, 14, 16 and 17, one decision unit of decision units 13 and 14 and one decision unit of decision units 16 and 17 will respond, but the other decision units will not. This is so since the circuits of the actuating coils 13a and 14a of decision units 13 and 14, are controlled by switches 12q and 12r, respectively, of decision unit 12, and the circuits of the actuating coils 16a and 17a of decision units 16 and 17 are controlled by switches 15q and 15r of decision unit 15. Since switches 12q and and 12r are closed alternately, only the actuating coils 13a and 14a of decision units 13 or 14 will be provided with an energizing circuit at one time. Similarly, since switches 15q and 15r are closed alternately, only one or the other of the actuating coils 16a and 17a of decision units 16 and 17 will be provided with an energizing circuit at any time during operation of the system. It will be observed further that each time the state of decision units 12 and 15 is changed, the selection of decision units 13, 14 and 16, 17 will be reversed.

With the decision units initially in the state as shown in the drawings, application of an excitatory signal to the actuating coil 13a of decision unit 13 will not result in energization of this decision unit since the energizing circuit of the actuating coil 13a is open due to the open position of switch 12q of decision unit 12. However, energization of the decision unit 14 will result upon application of an excitatory signal to its actuating coil 14a since the circuit of the latter actuating coil is completed through closed switch 12r of decision unit 12. Upon energization of the decision unit 14, the switch 14q is closed completing a circuit supplying power to pump 101. When the tape moves to supply an excitatory signal to decision unit 16, the decision unit will not be energized since its power supply circuit is interrupted by open switch 15q of decision unit 15. However, decision unit 17 will be energized responsively to an excitatory signal and switches 17q and 17j will close. Closing of switch 17q supplies power to the operator of valve 117 to open valve 117, and closing of the switch 17j energizes the operator of valve 112 to move valve 112 to open position. The opening of valves 112 and 117 places the filter 110 on-stream. In the event decision units 12 and 15 were each in a state opposite to their states shown in FIGURE 6A, the decision units 13 and 16 would respond starting pump 100 and placing filter 109 on-stream by opening valves 111 and 114.

Upon further movement of the tape to position the next group of coded perforations in contact with the sensing fingers, an excitatory signal is fed to decision unit 18. Since switch 18b is closed, decision unit 18 will be energized moving switch 18k to open position. This action places parallel connected switches 119A, 120A and 135 in series with the energizing circuit for the motive means 40 of the memory device 39. Should switches 119A, 120A and 135 be open, indicating that filters 109 and 110 do not require backwashing and that the level of the liquid in the tank 115 has not dropped to below a second predetermined level, the motive means 40 will be deenergized with the pump 101 in operation and the filter 110 on-stream.

In the event the on-stream filter 110 requires backwashing, switch 120A is closed, due to the pressure drop developed across the filter, and the motive means 40 is energized to move the next code group into contact with the sensing fingers to again energize decision unit 18 closing switch 18k. The tape continues to move on past the sensing fingers successively applying excitatory signals to the decision units 12, 13, 14, 15, 16, 17 and 19. Upon energization of decision units 12, switch 12q is closed and switch 12r opened to permit decision unit 13 to be energized in response to an excitatory signal but to prevent energization of decision unit 14. Similarly, upon energization of decision unit 15, switch 15q closes and switch 15r opens to render decision unit 16 responsive to an excitatory signal and decision unit 17 non-responsive. Thus, upon excitatory signals being fed to decision units 13 and 16, pump 100 will be placed into operation and valves 111 and 114 will be opened to place filter 109 on-stream. At this phase pump 101 will be in operation and filter 110 will be on-stream.

When decision unit 19 is energized, switch 19k is opened placing switch 134 in series with the energizing circuit for the motive means 40. In the event the liquid in the tank 115 is below a third predetermined level, switch 134 will be open, deenergizing the motive means 40 and thus maintaining pumps 100 and 101 and filters 109 and 110 in operation until the liquid level is raised sufficiently to affect closing of the switch 134 and resulting reenergization of the memory device. As the tape continues to move past the sensing fingers decision unit 19 is again energized to move switch 19k to closed position. Excitatory signals are then successively applied to decision units 12, 13, 14, 15, 16 and 17. Upon energization of decision unit 12, the decision units 14 and 17 are conditioned to respond to subsequent excitatory signals which effect stoppage of pump 101 and closing of valves 112 and 117 to cut filter 110 out of the circuit. At this phase the filters have been shifted, and the loaded filter 110 is in a condition to be purged. The tape continues to move past the sensing fingers and the interpreting network produces excitatory signals for successively energizing decision units 20, 21, 22, 23, 23, 22, 24, 24, 25, 25, 21 and 20.

Decision unit 20 is in condition to be energized upon application of an excitatory signal thereto when switch 119B and switch 15q of decision unit 15 are closed. Also, decision unit 21 is in condition to be energized responsively to an excitatory signal when switch 120B and switch 15r of decision unit 15 are closed. Energization of decision unit 20 completes the circuit of the actuating coil 22a of decision unit 22 through conductors 241 and 251, and the circuit of the actuating coil 24a of decision unit 24 through conductors 242 and 265, while energization of the decision unit 21 completes the circuit of the actuating coil 23a of decision unit 23 through conductors 248, 241 and 240, and the circuit of the actuating coil 25a of decision unit 25 through conductors 249 and 275. Upon energization of decision unit 20, switch 20q is closed completing a circuit through conductor 243 from the bus 205 to the operators of drain valve 122 and wash valve 128 associated with the filter 109, and upon energization of decision unit 21, switch 21q is closed completing a circuit through conductor 250 to operators of drain valve 124 and wash valve 129, associated with the filter 110. When decision unit 22 is energized, a circuit including conductors 252 and 253 is completed from the bus 204 to the drain valves 122 and 124 and the wash valves 128 and 129. If, as assumed, conductor 249 is connected to the bus 205 due to energization of decision unit 21, the actuating means associated with drain valve 124 will be energized to open the drain valve 124. Of course, if conductor 242 had been connected to bus 205 upon energization of decision unit 20, then drain valve 122 would be opened. When decision unit 22 is energized, wash valves 128 and 129 will be connected through conductor 253 to the bus 204, and either wash valve 128 or 129 will be opened depending upon whether conductor 242 or 249 is connected to the bus 205, which in turn depends upon whether decision unit 20 or decision unit 21 is energized. According to the sequence of operations assumed above, decision unit 21 will be energized and wash valve 129 will be opened. Energization of decision unit 23 completes a circuit initiating operation of the back wash pump 125 connected to the bus 205 through conductors 262 and 263. Thus, the purging cycle is formed in which liquid from the tank 115 is discharged from the pump 125 through conduit 127 and open valve 129, passed by conduit 116 through the filter 110 in reverse direction of flow (valves 112 and 117 being closed) and discharged from the filter through drain valve 124 and conduit 123.

When decision unit 23 is energized the memory device 30 is deenergized since switch 23k is open and normally open switch 255 is connected in series with the power circuit of the motive means 40. At the same time operation of timer motor 258 is also initiated. The timer motor 258 controls the switch 255, and after the timer motor is in operation for a period of time required to wash the filter, the timer motor effects closing of the switch 255 to again energize the memory device. As the tape moves past the sensing fingers excitatory signals are successively fed to the actuating coils of decision units 23 and 22, energizing these decision units so that they occupy the state shown in the drawing. This action deenergizes the timer motor 258, the drain valve 124, wash valve 129 and pump 125, deenergization of the timer motor 258 effecting opening of switch 255. Should decision unit 20 be energized instead of decision unit 21, the decision units 22 and 23 would function to open drain valve 122 and wash valve 128 and the washing cycle would be controlled by the timing motor 258 in the manner described above.

The memory device next applies an excitatory signal to decision unit 24. If decision unit 20 had been energized previously, due to closing of switch 119B, decision unit 24 would respond to this excitatory signal, but since it was assumed that decision unit 21 and not decision unit 20 was energized previously, decision unit 24 will ignore this instruction from the memory device. However, the circuit for the actuating coil 25a of decision unit 25 is completed through conductors 249 and 275, and the decision unit 25 is conditioned to respond to an excitatory signal from the memory device. Upon energization of decision unit 25, switch 25q is closed completing a circuit for the actuating device of control valve 112, through conductor 281, switch 25q and conductor 282 to bus 204, to open valve 112. At the same time the actuating device of rewash valve 133 is energized and valve 133 is opened. Open timer switch 266 is at this time connected in series with the power supply circuit of the motive means 40, and the memory device is deenergized, while operation of timer motor 269 is initiated. The circuit for the timer motor 269 includes conductors 270 and 277, contact 25f of decision unit 25, conductor 280 and contact 25u. This action results in the flow of liquid from tank 106, through the filter 110, by way of conduit 108 and open valve 112, and from the filter through conduit 132, open valve 133 to conduit 123 (valves 117, 124 and 129 being closed). After a predetermined period of time as is required to rewash the filter, the timer motor moves the switch 266 to closed position. When switch 266 closes, the memory device is energized and excitatory signals are successively applied to decision units 25, 21 and 20. Energization of decision units 25 and 21 reposition these decision units to their state as shown in the drawing with resulting deenergization of the timer motor 269 and the actuating devices of the valve 112 and wash valve 132 to close the valves 122 and 128, deenergization of the timer motor 269 moving switch 266 to open position. In the assumed cycle of operations switch 119B is open and therefore decision unit 20 will ignore instructions from the memory device. It will be noted that jacks 24e and 25e, contacts 24f and 25f, and contacts 24g and 25g of decision units 24 and 25 are interconnected by conductors 276, 277 and 278, and that jacks 24h and 24t and contacts 24i and 24u are interconnected by conductors 271 and 272, respectively. This arrangement permits rewashing operation under control of the timer motor 269 upon energization of decision unit 24 or decision unit 25.

The memory device then continues to successively apply excitatory signals to decision units 12, 13, 14, 15, 16 and 17, and 11. Energization of decision units 12 and 15 conditions the decision units 13 or 14 and 16 or 17, respectively, to respond to their excitatory signals, thereby deactivating all of the equipment. When an excitatory signal is applied to decision unit 11, the operating cycle described above is repeated in accordance with requirements of the plant. If switch 136 is closed, indicating that liquid is required in the tank 115, the memory device successively applies input signals to decision units 13, 14, 16, 17, and 18 to place the proper pump and filter on-stream in accordance with the alternation instructions previously described. If switch 136 is open, the memory device is deenergized upon energization of decision unit 11. From the above description, it can be seen that if the on-stream filter had not required purging, the memory device would have been deenergized upon unitial deenergization of decision unit 18, assuming that the liquid level in tank 115 had not fallen so low as to close switch 135.

The manner in which the decision units are interconnected and connected to operating and control or indicating elements of the industrial plant of FIGURE 5, as shown in FIGURES 6A, 6B, 6C and 6D, merely illustrates one application of the novel method and apparatus provided by the present invention to control operation of an industrial plant of the type shown in FIGURE 5 according to a specific, predetermined process. It is to be understood that the decision units may be interconnected and connected to operating and control or indicating elements of the plant of FIGURE 5 in a different manner to cause the plant to operate according to a different process, or sequence of process steps, when appropriate instruction codes are stored on the tape fed to the memory device. Moreover, the principles of the present invention may be practiced in a similar manner, by applying required instruction codes to the tape and by making appropriate connections to the decision units, to control operation of any process according to a program that can be expressed in definite, unambiguous numerical terminology in which the predetermined instruction codes affect operation of plant elements in correlation with variables of the process. Furthermore, although the present invention has been disclosed and described in connection with a group of decision units comprising a modular decision unit panel, permitting the system to be easily modified to take care of plant expansion and variations in operation of a plant being controlled, it is to be understood that the decision units may be in the form of permanent circuits designed specifically for use with a particular plant, if desired. In addition, it is within the scope of the present invention to employ an arrangement in which the storage tape rotates in different directions responsively to variables of a process to provide the desired control. A decision unit may be used to determine the direction of operation of the tape responsively to a variable signal from the process or responsively to a predetermined code depending upon the state of other related decision units which in turn are determined by variables of the process. Accordingly, reference will be had to the appended claims for a definition of the limits of the invention.

What is claimed is:

1. Apparatus for controlling operation of a plurality of functionally related elements to affect their performance in accordance with a condition determined operating program, comprising information storage means for storing instruction codes of predetermined operating programs, means for selectively reading out instruction codes, converting means for converting read-out instruction codes into excitatory signals, a plurality of logical units each connected between the converting means and different functionally related elements, sensing means for measuring a variable indicative of the instantaneous condition of at least one of the related elements and producing an output signal in accordance therewith, the variable being independent of the instruction codes, and circuit means operatively connecting the output of the sensing means through at least one of the logical units to control the means for selectively reading out instruction codes.

2. Apparatus for operating a plurality of functionally related elements to affect their performance in accordance with a condition determined operating program, comprising information storage means storing instruction codes of a predetermined sequentially related operating program for the plurality of elements, means for selectively reading out instruction codes, means for converting read-out instruction codes into excitatory signals, sensing means for producing a signal indicative of a functionally independent characteristic of at least one of the elements, logic means connected to effect operation of the elements responsive to excitatory signals and to control the means for selectively reading out instruction codes in accordance with the sensory signals to carry out a predetermined operating program.

3. Apparatus for controlling a system according to a condition determined program, the system comprising controllable functionally related elements in which the condition of some of the controllable elements is determined by a functionally independent variable, comprising information storage means storing instruction codes of predetermined operating programs for the functionally related elements, means for selectively reading out instruction codes, means for converting read-out instruction codes into excitatory signals, means for producing sensory signals indicative of the condition of at least one of the functionally related elements, and a plurality of logical units for operating the controllable elements responsively to excitatory signals, the logical units including a relay means for modifying operation of the controllable elements and the means for selectively reading out instruction codes in accordance with the sensory signals to carry out a predetermined operating program.

4. In combination, a system including functionally related controllable elements some of which are responsive to variables independent of the system, storage means storing instruction codes of a predetermined operating program for the system, means for selectively reading out instruction codes from the storage means, means for converting read-out instruction codes into excitatory signals, means for producing sensory signals indicative of a characteristic of elements which are responsive to an independent variable, and a plurality of logical units for operating controllable elements responsively to excitatory signals, the logical units including relay means controlled by the sensory signals for modifying operation of the controllable elements and the storage means to affect the predetermined operation of the system consistent with an independent variable.

5. Apparatus for controlling a plurality of elements to effect their operation in accordance with a condition determined operating program, the elements including at least one element responsive to a variable independent of the operating program, comprising storage means storing instruction codes for operating a plurality of the elements simultaneously, sensing means for producing signals indicative of the condition of an element responsive to an independent variable, selectively actuated read-out means for the instruction codes, means for converting readout instruction codes into excitatory signals, and means for controlling the elements responsively to the excitatory signals and the sensing means signal to carry out the condition determined operating program.

6. A system for controlling operation of functionally interconnected elements according to a predetermined operating program, comprising a memory device for storing coded operating instructions for the elements and reading out signals therefrom, a variable impedance network connected to the output of the memory device and having a plurality of output circuits, the variable impedance network converting read-out signals to excitatory signals related to the interconnected elements and feeding excitatory signals to respective output circuits, a decision unit coupled to each of the output circuits for energization responsively to an excitatory signal, each of the decision units including an impedance device capable of being placed in a high impedance state and a low impedance state alternately in response to successive energization by excitatory signals, means for connecting decision units to interconnected elements to control the operation of the interconnected elements, sensing means for generating an output signal indicative of a characteristic of one of the elements, means for controlling energization of at least one of the decision units responsive to the output signal of the sensing means, and circuit means for controlling reading-out of instruction codes connected between the decision unit energized in response to the output signal of the sensing means and the memory device.

References Cited in the file of this patent
UNITED STATES PATENTS

| | | |
|---|---|---|
| 2,537,427 | Seid et al. | Jan. 9, 1951 |
| 2,690,532 | Johnson | Sept. 28, 1954 |
| 2,710,934 | Senn | June 14, 1955 |
| 2,715,703 | Schuck | Aug. 16, 1955 |
| 2,741,732 | Cunningham | Apr. 10, 1956 |
| 2,750,548 | Van Dalen | June 12, 1956 |
| 2,755,422 | Livingston | July 17, 1956 |
| 2,776,733 | Drexler | Jan. 8, 1957 |
| 2,784,359 | Kamm | Mar. 5, 1957 |